United States Patent [19]

Platt

[11] 4,108,572

[45] Aug. 22, 1978

[54] COMPOSITE ROTOR BLADE

[75] Inventor: Charles Elmore Platt, Vernon, Conn.

[73] Assignee: United Technologies Corporation, Hartford, Conn.

[21] Appl. No.: 753,742

[22] Filed: Dec. 23, 1976

[51] Int. Cl.² ............................ F01D 5/14; F11D 5/28
[52] U.S. Cl. .................... 416/230; 416/224; 416/241 A
[58] Field of Search ............. 416/229, 230, 241 A, 416/229 A, 224

[56] References Cited

U.S. PATENT DOCUMENTS

| 3,294,366 | 12/1966 | Coplin | 416/229 A X |
|---|---|---|---|
| 3,572,971 | 3/1971 | Seiwert | 416/224 X |
| 3,600,103 | 8/1971 | Gray et al. | 416/230 X |
| 3,602,608 | 8/1971 | Morley | 416/230 X |
| 3,637,325 | 1/1972 | Morley | 416/230 |
| 3,701,190 | 10/1972 | Stone | 29/156.8 |
| 3,827,118 | 8/1974 | Appel | 416/230 X |
| 3,886,647 | 6/1975 | Alexander | 228/175 |
| 3,942,231 | 3/1976 | Whitaker | 29/156.8 B |
| 4,022,547 | 5/1977 | Stanley | 416/230 |

FOREIGN PATENT DOCUMENTS 1,433,519  4/1976  United Kingdom ..................... 416/230

Primary Examiner—Everette A. Powell, Jr.
Attorney, Agent, or Firm—Robert C. Walker

[57] ABSTRACT

A composite rotor blade for a turbomachine is disclosed. Concepts for maximizing the blade strength to weight ratio while maintaining adequate resistance to foreign object damage are developed. Techniques for maximizing the torsional rigidity of the structure are disclosed, and in one embodiment, a judicious yet effective placement of titanium sheet material on the pressure side of the blade is made.

7 Claims, 3 Drawing Figures

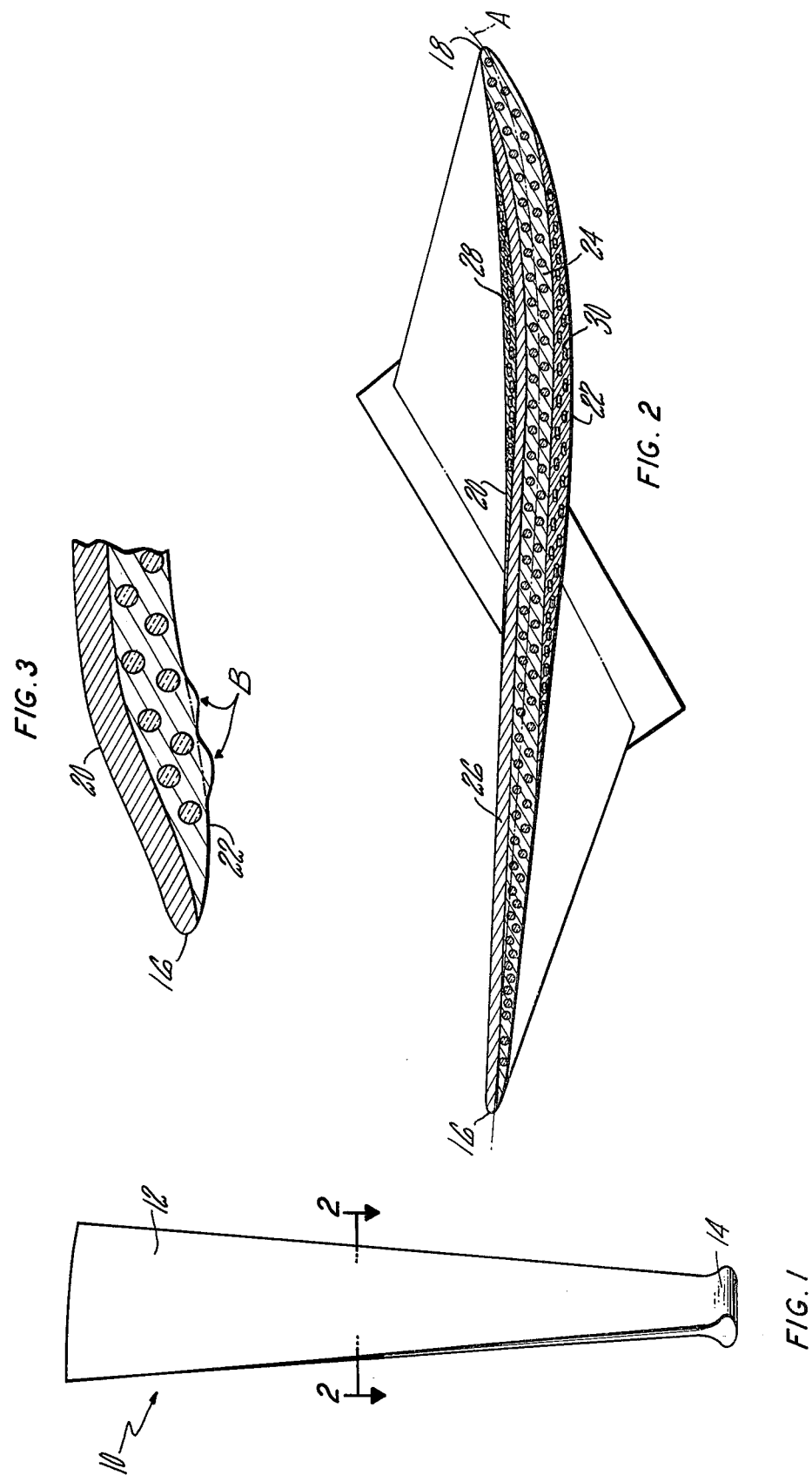

COMPOSITE ROTOR BLADE

BACKGROUND OF THE INVENTION

1. Field of the Invention

This invention relates to rotor blades for turbomachines and, more particularly, to blades formed of high strength, high modulus fibers embedded in a matrix material.

2. Description of the Prior Art

The operational characteristics and desired attributes of rotor blading are well understood by scientists and engineers working in the turbomachinery field. Against this background very substantial research efforts continue to be applied to the development of material systems which will enhance the desired attributes of blades in their operational environment.

One desired characteristic is a high strength to weight ratio in the blade system. In recent years the extensive use of titanium has enabled dramatic increases in blade strength to weight ratios when compared to formerly used steel or aluminum blades. Titanium is now cnsidered to be the state of the art material for most compressor blade applications.

Another desired characteristic is a high stiffness to weight ratio. The high stiffness reduces the susceptibility of the rotor blades to deleterious effects of adverse vibratory stimuli. Substantial aerodynamic improvements are obtainable in blade systems having adequate torsional stiffness without part span shrouds.

Composite materials formed of high strength, high modulus fibers embedded in a matrix material have for the last decade held great promise for future dramatic increases in strength to weight and stiffness to weight ratios. Unfortunately, however, composite blades have, heretofore, had a notoriously low tolerance to foreign object damage. Developed systems, such as those shown in typical prior art U.S. Pat. Nos. 3,098,723 to Micks entitled "Novel Structural Composite Material"; 3,572,971 to Seiwert entitled "Lightweight Turbo-Machinery Blading"; 3,649,425 to Alexander entitled "Arcuate Shaped Composites of Refractory Tapes Embedded in a Metal Matrix"; 3,699,623 to Kreider entitled "Method for Fabricating Corrosion Resistant Composites"; and 3,762,835 to Carlson et al. entitled "Foreign Object Damage Protection for Compressor Blades and Other Structures and Related Methods", encase a brittle composite material in a more ductile, all metallic sheath to improve resistance of the composite structure to foreign object damage.

Further improvements enhancing the survivability of composite blades and enhancing the manufacturability of composite blades are required before full utility in turbomachines can be realized.

SUMMARY OF THE INVENTION

A primary object of the present invention is to provide a rotor blade structure having high strength to weight and high stiffness to weight ratios. Adequate resistance of the blade structure to foreign object damage is sought; and in one embodiment, effective but judicious use of titanium is made to improve resistance to foreign object damage in a predominantly composite material structure. A further object is to optimize the torsional rigidity and spanwise strength of the blade structure.

According to the present invention a core of high strength, high modulus fibers extending in a spanwise direction across the length of a rotor blade has affixed to the suction side thereof, a laminate of crossply composite material and has affixed to the pressure side thereof, a combined titanium sheet and laminate of cross-ply material, the combination having a contribution to total blade stiffness which approximates the contribution to total blade stiffness of the laminate of crossply material on the suction side of the blade.

A primary feature of the present invention is the core of spanwise extending fibers. Another feature is the titanium sheet which extends from the leading edge along the pressure side of the blade. Yet other features are the pressure side laminate of crossply composite material affixed to the titanium sheet at the midchord region of the blade and the suction side laminate of crossply composite material affixed to the core at the midchord region of the blade.

A principal advantage of the rotor blade is the high strength to weight ratio provided by maximized use of spanwise extending fibrous material. Another important advantage is the resistance to foreign object damage provided by the titanium sheet. The materials with the greatest shear stiffness are disposed at the maximum distance from the airfoil mean line. Symmetrical contributions of the materials to torsional rigidity, maximize the torsional stiffness of the blade by locating the center of torsional rigidity in close proximity to the geometric mean line of the airfoil.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 1 is a perspective view of a rotor blade;

FIG. 2 is an enlarged sectional view taken along the line 2—2 as shown in FIG. 1; and FIG. 3 is a greatly enlarged sectional view of the leading edge along the line 2—2 of FIG. 1 showing the matrix buildup which occurs between plies on the suction side of the deformed blade as a result of foreign object impact.

DESCRIPTION OF THE PREFERRED EMBODIMENT

A rotor blade, such as the fan blade 10 of a gas turbine engine which is shown in FIG. 1, has an airfoil section 12 and a root section 14. An enlarged cross section view through the airfoil is shown in FIG. 2. The airfoil section has a leading edge 16 and a trailing edge 18. The pressure side 20 of the airfoil section and the suction side 22 are also shown. The airfoil section has a core 24 of high strength, high modulus fibers embedded in a matrix material and which extend in a spanwise direction through the blade. A titanium sheet 26 extends from the leading edge along a major portion of the pressure side of the airfoil. A first laminate 28 of crossply composite material covers the midchord region and is affixed to the titanium sheet at the pressure side of the airfoil section. A second laminate 30 of crossply composite material covers the midchord region and is affixed to the core at the suction side of the airfoil.

The core 24 of spanwise fibers gives the structure a very high spanwise strength to weight ratio. The high strength to weight ratio enables a reduction in the size of the structure required to support the blades in an operating engine. Collaterally, composite materials have very high strength to cross-sectional area ratios and, accordingly, enable aerodynamically improved blade designs. A dramatic improvement occurs near the blade root where decreased thickness blades add substantially to the cross-sectional area of the working medium flow path.

The spanwise extending fibers of relatively flat blades impart little torsional rigidity to the system. A lack of torsional rigidity is especially critical in fan blades where adverse vibratory stimuli and self-excitation may destructively impair the life of the blade. In accordance with the teaching herein torsional rigidity is imparted to the blade system by the combined titanium sheet and the first laminate of crossply material on the pressure side of the airfoil and by the second laminate crossply material on the suction side of the airfoil. Nearly equal stiffness contributions of torsionally rigid material on the pressure and suction sides of the airfoil are employed to maximize airfoil stiffness.

The torsional stiffness of the structure is a function of the distance of the stiffening material from the center of torsional rigidity.

$$K = 4 \int \int Gx^2 dx db$$

where
$K$ = torsional stiffness;
$G$ = shear modulus;
$x$ = the distance of the material from the center of torsional rigidity; and
$b$ = distance along the airfoil section mean line.

The placement of the material having the largest effective shear modulus is critical. The further this material is placed from the center of stiffness of the structure, the greater the contribution to torsional stiffness becomes. In one particular blade system the high strength, high modulus fibers of both the core and the crossplies are boron and are embedded in an aluminum alloy matrix. In this system the shear modulus of the crossply material is greater than the shear modulus of the titanium. The shear modulus of the core material, however, is substantially less than that of either the titanium or the crossply material. Accordingly, the core material contributes insignificantly to the total torsional stiffness of the structure.

The center of stiffness is maintained closely proximate to the geometric mean line (A) of the airfoil. The crossply material at the suction side and the combination of crossply material and titanium sheet at the pressure side are balanced to provide nearly equal contributions to the stiffness of the total structure. As is viewable in FIG. 2, a greater amount of crossply material is disposed at the suction side of the airfoil to compensate for the titanium disposed at the pressure side of the airfoil.

Chordwise bending of the blade at impact with a foreign object produces tensile stresses on the pressure side of the blade and compressive stresses on the suction side of the blade. The titanium sheet has dramatically greater tensile strength in the chordwise direction than does the matrix material in the core fibers to which it is adhered. The titanium sheet imparts tensile strength to the core matrix and the susceptibility of the blade to tensile failure at the pressure side surface is greatly reduced. It is concluded that extending the titanium sheet over approximately 75 percent of the chord length or greater reduces the susceptibility of the structure to fracture at impact.

Although titanium would apparently offer comparable benefits if deployed on the suction side of the airfoil, this dual use of titanium has been found to be less effective than an equivalent thickness of spanwise composite. The spanwise composite on the suction side under the deformation from impact loads carries a spanwise strain and imparts impact resistance to the structure. Additionally, at impact the leading edge of the blade is deformed as illustrated in FIG. 3. Tensile stresses at the pressure side of the airfoil are tolerated by the titanium material. Compressive stresses at the suction side of the airfoil cause local bulging (B) of the matrix material, and as a result thereof, increased cross-sectional area of the matrix material. The ability of the composite material to withstand further deformation is enhanced by the increased cross section.

The judicious use of appropriate materials is employed in the blade structure disclosed. Titanium material is disposed along the leading edge, and in a principal embodiment, does not extend to the suction side of the airfoil. A limited amount of crossply material is adhered to the suction and pressure sides of the airfoil to improve torsional rigidity. Maximum use of spanwise extending fibers is enabled by the judicious deployment of crossply material and titanium.

Although the invention has been shown and described with respect to preferred embodiments thereof, it should be understood by those skilled in the art that various changes and omissions in the form and detail thereof may be made therein without departing from the spirit and scope of the invention.

Having thus described typical embodiments of my invention, that which I claim as new and desire to secure by Letters Patent of the United States is:

1. A composite rotor blade of the type adapted for use in a turbomachine and having a leading edge, a pressure side and a suction side, the improvement comprising:
a core of high strength, high modulus fibers embedded in a metal matrix with the fibers extending in the spanwise direction through the blade;
a sheet of titanium adhered to the pressure side of said core and extending from the leading edge over approximately 75 percent of the blade chord;
a first laminate of crossply composite material of high strength, high modulus fibers embedded in a metal matrix which is adhered to said titanium sheet in the midchord region of the blade; and
a second laminate of crossply composite material of high strength, high modulus fibers embedded in a metal matrix which is adhered to the suction side of said blade core.

2. The invention according to claim 1 wherein said high strength, high modulus fibers are boron and wherein said metal matrix is an aluminum base alloy.

3. The invention according to claim 1 wherein said titanium sheet and said first laminate of crossply material are adapted to provide a component of total blade torsional stiffness which approximates the component of stiffness provided by said second laminate of crossply material.

4. The invention according to claim 3 wherein said high strength, high modulus fibers are boron and wherein said metal matrix is an aluminum base alloy.

5. A rotor blade structure including an airfoil section having a spanwise extending core of high strength, high modulus fibers embedded in a metal matrix, a titanium sheet adhered to said core and forming a portion of the pressure side surface of said airfoil, a first laminate of crossply composite material adhered to said titanium sheet and forming a portion of the pressure side surface of said airfoil, and a second laminate of crossply composite material adhered to said core and forming a portion of the suction side surface of the airfoil, wherein said titanium sheet and said first laminate in combination are adapted to provide a contribution to total torsional stiffness of the structure which approximates the contribution to total torsional stiffness of said second laminate.

6. The invention according to claim 5 wherein said high strength, high modulus fibers are boron and wherein said metal matrix is an aluminum base alloy.

7. The invention according to claim 6 wherein said titanium sheet extends from the leading edge of said airfoil section over approximately 75 percent of the blade chord.

* * * * *